United States Patent
Lohmar et al.

(10) Patent No.: US 9,420,534 B2
(45) Date of Patent: Aug. 16, 2016

(54) TECHNIQUE FOR MANAGING STREAMING MEDIA TRAFFIC AT A NETWORK ENTITY

(75) Inventors: Thorsten Lohmar, Aachen (DE); Frederic Gabin, Bagnolet (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 422 days.

(21) Appl. No.: 14/130,273

(22) PCT Filed: Jun. 28, 2011

(86) PCT No.: PCT/EP2011/003181
§ 371 (c)(1),
(2), (4) Date: Dec. 30, 2013

(87) PCT Pub. No.: WO2013/000489
PCT Pub. Date: Jan. 3, 2013

(65) Prior Publication Data
US 2014/0140253 A1    May 22, 2014

(51) Int. Cl.
*H04W 52/02*  (2009.01)
*H04L 29/06*  (2006.01)
*G06F 1/32*   (2006.01)

(52) U.S. Cl.
CPC ......... *H04W 52/0216* (2013.01); *G06F 1/3278* (2013.01); *H04L 65/4084* (2013.01); *H04L 65/80* (2013.01); *Y02B 60/126* (2013.01)

(58) Field of Classification Search
None
See application file for complete search history.

(56) References Cited

U.S. PATENT DOCUMENTS

| | | | |
|---|---|---|---|
| 8,442,475 B2 * | 5/2013 | Antonio | H04W 52/0232 455/343.1 |
| 9,119,208 B2 * | 8/2015 | Dwyer | H04W 76/046 |
| 2006/0084444 A1 | 4/2006 | Kossi et al. | |
| 2011/0069649 A1 | 3/2011 | Gobriel et al. | |
| 2012/0120858 A1 * | 5/2012 | Das | H04W 52/0229 370/311 |
| 2014/0140253 A1 * | 5/2014 | Lohmar | H04L 65/4084 370/311 |

OTHER PUBLICATIONS

Office Action dated Oct. 14, 2014, issued in Mexican Patent Application No. MX/a/2013/015115, 2 pages.
3GPP, 3rd Generation Partnership Project; Technical Specification Group Services and System Aspects; Transparent end-to-end Packet-switched Streaming Service (PSS); Protocols and codecs (Release 9), 3GPP TS 26.234 V9.0.0, 2009, 167 pages.

* cited by examiner

*Primary Examiner* — Benjamin H Elliott, IV
(74) *Attorney, Agent, or Firm* — Rothwell, Figg, Ernst & Manbeck, P.C.

(57) ABSTRACT

A method for managing streaming media traffic at a network entity capable of assuming a first and a second radio channel state, a transition from the first to second radio channel state requiring a first predetermined time period $t_1$, comprising combining, at the network entity, at least two media segments such that a resulting combined media segment comprises media data equivalent to a second predetermined time period $t_2$, the second time period being greater than the first time period, transmitting, from the network entity, the combined media segment in the first radio channel state during a third time period $t_3$, initiating transition, at the network entity, from the first to the second radio channel state, and waiting, at the network entity after the initiating step, at least for a time period $t=t_2-t_3-t_1$, wherein the second time period is greater than the sum of the first and third time periods.

34 Claims, 10 Drawing Sheets

Test Setup

> UE connected to the RBS via coaxial cable
  – Perfect radio environment
  – Only one UE in the cell > State transitions captured in the RNC > User plane captured with Wireshark on the IU-interface > WCDMA RAN configuration
  – RNC
    > Model: 3810
    > SW: CXP9014711/1_R1V (W10.0)
  – RBS
    > Model: 3206
    > SW: CXP9014346/1_R2AA/6 (W10.0)

HLS with 10sec segment sizes

HLS with 80sec segment sizes

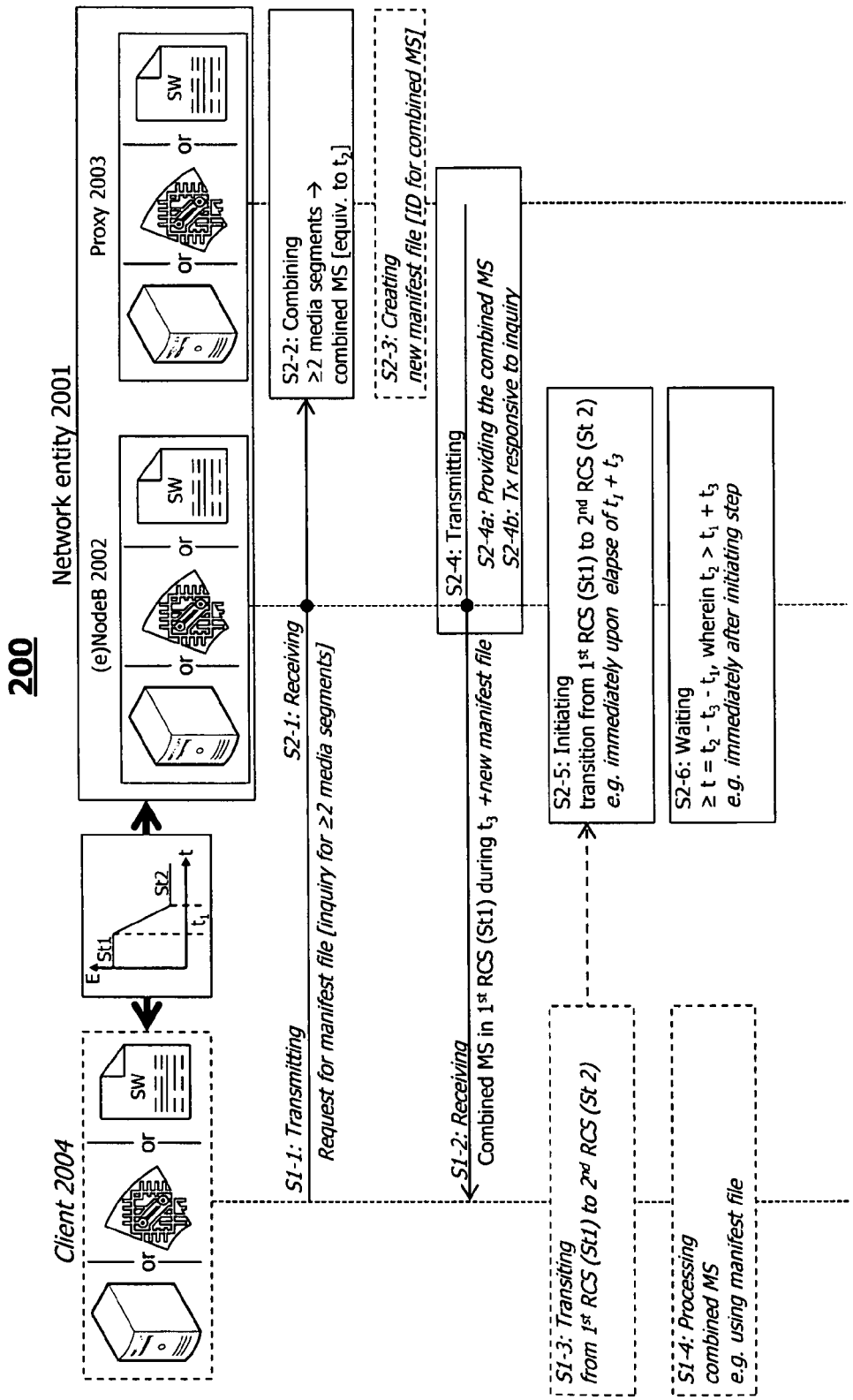

TECHNIQUE FOR MANAGING STREAMING MEDIA TRAFFIC AT A NETWORK ENTITY

CROSS REFERENCE TO RELATED APPLICATION(S)

This application is a 35 U.S.C. §371 National Phase Entry Application from PCT/EP2011/003181, filed Jun. 28, 2011, designating the United States, the disclosure of which is incorporated herein in its entirety by reference.

TECHNICAL FIELD

The present disclosure relates to a technique for managing streaming media traffic at a network entity.

BACKGROUND

Streaming technologies are used for delivering media, e.g. audio and video, provided by a streaming provider to an end-user such that the media is constantly received by and presented to the end-user. Hypertext Transfer Protocol (HTTP) streaming is a mechanism for sending data from a web server to a web browser. HTTP streaming can be achieved through several mechanisms.

Adaptive HTTP streaming is becoming the dominant content streaming technique. Adaptive Streaming (or Adaptive Bitrate Streaming) is a technique used in streaming multimedia over networks like computer networks. Today's adaptive streaming technologies are almost exclusively based on HTTP and designed to work efficiently over large distributed HTTP networks such as the Internet. In principal, adaptive streaming works by detecting a user's bandwidth in real time and adjusting the bitrate and therefore quality of the audio/video stream accordingly. It requires the use of an encoder which can encode a single source audio/video at multiple bit rates. The player client switches between the different encodings depending on available resources.

A number of different techniques exist such as HTTP Live Streaming (HLS) from Apple™, Smooth streaming (ISM) from Microsoft™ and 3GPP ($3^{rd}$ Generation Partnership Project)/Moving Picture Expert Group (MPEG) Dynamic Adaptive Streaming over HTTP (DASH).

Those adaptive HTTP streaming techniques all have common principles: The client receives the content stream as a sequence of files (as a response to HTTP GET requests), or as a sequence of file chunks (as a result of HTTP GET byte-range requests), which is then decoded and played as a continuous media stream. The Uniform Resource Locators (URLs) of the file sequence are described in a manifest file, which is an .m3u8 playlist in case of HLS, an .ismc file in case of ISM and an .MPD file in case of DASH.

FIG. 1 shows a principle of adaptive HTTP streaming, more particular, reception of media segments.

As shown in FIG. 1, a communication network 100 comprises a server 1001 and a client 1002. In step S1, client 1002 requests the manifest file from the server 1001 by means of a "HTTP GET manifest file" request. In response, server 1001 transmits the manifest file to client 1002. In step S2, client 1002 processes the manifest file and requests, in step S3, the first segment (e.g., with the lowest available media data rate (such as the lowest available quality)), as specified in the manifest file, from server 1001.

In step S4, during download of the manifest file occurring in step S5, the client 1002 measures the download speed and uses this estimation to select, in S6, an appropriate representation (an appropriate quality) for the next (e.g. second) segment. For example, client 1002 selects a medium available media data rate (a medium available quality). In step S7, the next segment is requested by client 1002 with a data rate slightly higher than the media data rate theoretically required by the segment (otherwise, the media like a video may frequently stop playing). In step S8, during the download of the second segment occurring in step S9, client 1002 again measures the download speed.

In short, client 1002 fetches one media segment (or file) after another according to the pre-setting in the manifest file. During file download, client 1002 estimates the available link bitrate (download speed). Depending on the difference between the available link bitrate and the encoded bitrate of the media, and taking into account e.g. the client's capabilities (e.g. screen resolution), the client selects an appropriate quality representation (e.g. slightly lower than the measured link bitrate).

FIG. 2 shows an example of an adaptive HTTP stream.

As shown in FIG. 2, in order to prepare a continuous stream of content for adaptive HTTP streaming, the stream is segmented into media segments (or files) X, . . . , X+2 on the side of the server 1001. Each segment can consist of one or more frames. These media segments are fetched by client 1002 one-by-one as independent files each as a HTTP response from server 1001 in response to a HTTP request from client 1002. Upon receipt, client 1002 can append the received media segments X, . . . , X+2 (which may possess different quality levels) into a continuous stream again. Then, client 1002 can play the segments continuously and thereby provide a continuous stream playout.

EXPERIMENTAL BACKGROUND EFFECTED BY THE PRESENT INVENTORS

Video transmission for modern smartphones may require media bitrates between 200 kbps (e.g. low quality for an iPhone™) and 600 kbps (e.g. low quality for an iPad™). However, shared bearers such as High Speed Packet Access (HSPA) and Long Term Evolution (LTE) can offer peak bitrates of 6 Mbps and more. Consequently, in order to save battery and use system resources efficiently, the radio channel offers a number of states.

FIG. 3 shows a diagram of data rate plotted against power consumption of different radio channel.

For example, the Cell Dedicated Channel (Cell-DCH) state allows the highest peak-bitrates, but requires also high system resources and drains the mobile phone battery the most compared to other states. The Cell Forward Access Channel (Cell-FACH) radio state requires less system resources and battery power, but still allows for moderate bitrates. The radio network may cause the radio channel to transit into that "lower" state after a certain bearer idle period (i.e., no data transmitted). A timeout of 2 sec may be used. When the radio channel is idle for e.g. for another 10 sec, the radio network may cause the radio channel state to transit to the UTRAN (UMTS (Universal Mobile Telecommunications System) Terrestrial Radio Access Network) Registration Area Paging Channel (URA-PCH) state, which is more battery efficient, but offers almost no bitrate.

Experiments effected by the present inventors have evaluated the behaviour of modern smartphones e.g. with iOS™ (iPhone™, iPad™, etc.) and Android™ operating systems.

FIG. 4 shows the corresponding test set-up. As shown in FIG. 4, the client may take the form of a user equipment (UE). In order to avoid artifacts related to the air interface (such as channel crosstalk, atmospheric noise, signal shadowing etc.), the UE has been connected to the Radio Base Station (RBS)

via a coaxial cable, thus simulating a perfect radio environment having only one UE in the cell in question. The network elements in the signal path between the server (here: a File Transfer Protocol (FTP) server or the Internet) may include a Radio Network Controller (RNC), a Media Gateway (MGW), a Mobile Switching Center (MSC)/Home Location Register (HLR), a Serving General Radio Packet Service (GRPS) Support Node (SGSN), and a Gateway GPRS Support Node (GGSN).

The above-described test set-up allows logging of the radio channel states in NodeBs and also network traffic on the Iu Interface.

FIG. 4A shows the test result obtained by the set-up depicted in FIG. 4, using a 264 kbps media stream with a media segment size of 10 sec. FIG. 4A shows two curves: the bitrates (left y-axis: Throughput and peaky curve) and radio channel state (right y-axis: State and rectangular curve) both against time for the adaptive HTTP streaming session.

As shown in the radio channel state curve, the client fetches a new media segment approx. every 10 seconds. However, since HSPA with a maximal downlink bitrate of e.g. 6.5 Mbps is used, the actual download duration of a media segment is much less than 10 seconds (see bitrate curve). The radio network causes the client to transit from the Cell-DCH state into the Cell-FACH state, as soon as the radio channel is idle for e.g. at least 2 sec. Since each media segment contains an equivalent of 10 seconds of media data, the radio channel does not become idle for more than e.g. 10 seconds, and thus the radio channel does not transit into the URA-PCH state.

FIG. 4B shows two example graphs of media streams with an equivalent media segment size of 80 seconds of media data. The upper graph depicts a media quality of 264 kbps (200 kbps for video and 64 kbps audio) and the lower graph a 928 kbps video clip (800 kbps video and 128 kbps audio).

In both graphs, the radio channel state remains, after transition, into the URA-PCH state for a certain time period, e.g. for 10 seconds or more. This happens despite the fact that the network may need to await a timeout for e.g. 12 seconds before transiting (e.g. URA-PCH timer of 2 seconds and Cell-FACH timer of 10 seconds, as shown in FIG. 3). It is to be noted that although the lower graph shows a clip with a three-time fold of media quality compared to the upper graph, the download of a media clip requires less than three times the lower quality download time.

In summary, mobile phones are saving battery power, when media segments contain media data equivalent to a data amount that allows the radio channel state to transit in to a low-power state (e.g. URA-PCH). For example, the equivalent data amount may be 40 seconds to 60 seconds of media data or more.

In other words, the mobile phone takes in media data equivalent to a time period (e.g. 80 seconds) at a very high download rate and then can transit the radio channel state into a sleep mode (e.g. URA-PCH). The performance can be further improved, when the mobile phone uses the Fast Dormancy feature (i.e. the timeout periods between the radio channel states are shortened or become almost zero).

SUMMARY

The amount of so-called over-the-top traffic increases. And operators do not have control over content preparation. Content may be prepared according to different recommendations which may lead to a rather inefficient battery and system efficiency. In this respect, the manifest file describes (almost accurately) the media data per media segment (or file). Recommendations for media segment duration include 2 seconds and 10 seconds, which may also apply to Over-The-Top (OTT) content.

Consequently, there is a need for managing streaming media traffic at a network entity. In particular, this means that content is to be created in a way which does not prevent the radio network or mobile phone from putting the radio channel e.g. into URA-PCH state. In this way, system resources and battery power of the client are saved.

In a first aspect, a method for managing streaming media traffic at a network entity is provided, the network entity being capable of assuming at least a first radio channel state and a second radio channel state, wherein a transition from the first radio channel state to the second radio channel state requires a first predetermined time period $t_1$. The method is performed in the network entity and comprises the steps of combining, at the network entity, at least two media segments such that a resulting combined media segment comprises media data equivalent to a second predetermined time period $t_2$, the second time period being greater than the first time period; transmitting, from the network entity, the combined media segment in the first radio channel state during a third time period $t_3$; initiating transition, at the network entity, from the first to the second radio channel state; and waiting, at the network entity after the initiating step, at least for a time period $t=t_2-t_3-t_1$, wherein the second time period is greater than the sum of the first and third time periods. In this way, it can be ascertained that the network entity (and hence) the network assumes the (power-saving) second state for a time t being greater than 0.

Further, in the combining step, the at least two media segments may have a data amount less than transmittable during the second time period in the first radio channel state. In this context, the initiating step may be performed immediately upon elapse of a sum of the first and third time periods, and the waiting step may be performed immediately after the initiating step. As discussed hereinabove, this serves for both seamlessly providing the media stream (e.g. 80 seconds worth of media data may be transmitted in approximately 6 seconds) and for power-saving (e.g. after 6 seconds of transmission, the network assumes a power-saving state after 12 more seconds, thus leaving 80 sec–6 sec–12 sec=62 sec for power-saving in one cycle).

Moreover, the method may comprise, prior to the combining step, receiving a request for a manifest file comprising an inquiry for the at least two media segments. In this case, the method may further comprise creating a new manifest file comprising an identifier for the combined media segment. In the latter event, the created new manifest file may further comprise an indicator for indicating the first predetermined time period. The identifier may be a uniform resource locator, URL. As for implementations, the manifest file may be one of a .m3u8 playlist, a .ismc file and a .MPD file. By using the manifest file, the network entity has a simple and powerful tool for embodying and facilitating the present invention; that is, the client having requested the manifest file does not get an ordinary manifest file, but one having an indication of the combined media segments in the sense of the present invention. In this way, the client is re-configured to implement the combined media segments without any hardware or software re-equipment becoming necessary.

Still further, the first radio channel state may be a Cell-DCH state, and the second radio channel state may be a Cell-FACH state. In this case, the first time period may become 2 seconds. Alternatively, the first radio channel state may be a Cell-FACH state, and the second radio channel state may be a URA-PCH state. In the latter case, the first time period may become 10 seconds. As a third alternative, the first radio channel state may be a Cell-DCH state, and the second radio channel state may be a URA-PCH state. In the latter case, the first time period may become 12 seconds. Exploitation of the above radio channel state allows for easy implementation of the present invention exploiting the already present infrastructure for those radio channel states. Dimensioning the timeouts (first time period) as above leverages transiting too slowly into the power-saving state (resulting in unnecessary standby consuming battery power unnecessarily) against transiting too quickly into the power-saving state (resulting in unnecessary rebooting operations due to new transmittable media data becoming available faster than expected). It is to be noted that the example timeouts are not meant in a limiting sense; in principle, any time greater than zero in the power-saving state aids to power saving.

Moreover, the second time period may be between 40 seconds to 80 seconds or more. Particularly, the second time period may be between 60 seconds to 80 seconds or more. As a non-limiting example, the present invention works advantageously if the second time period (i.e., equivalent time period for the media data) is 80 seconds (see FIG. 4B). Accordingly, the gain becomes greater as the second time period increases. However, considering real-time constraints and limited client memory resources, the above win-win-situation is not to be construed to an extreme case in which e.g. an entire movie e.g. of several hours is downloaded in "only" several minutes, allowing—theoretically—the network to enter the power saving mode for more than one hour; such a behaviour would clearly exceed both the client's and the network's capabilities.

Still further, the network entity may comprise one of a transparent function and an add-on to a Hypertext Transfer Protocol, HTTP, server. This allows for simple implementation of the present invention.

As an alternative to the above, the network entity may comprise a proxy server and one of a nodeB and an evolved nodeB. In that case, the combining step (and the creating step) may be performed by the proxy server, and the transmitting, initiating and waiting steps (as well as all the receiving step) may be performed by the one of the node B and evolved nodeB. Again, this allows for simple implementation of the present invention having minimum impact on the existing network structure.

In a second aspect, there is provided a method for managing streaming media traffic between the network entity according to the above aspect and its additional features and a client. In that case, the method may comprise transmitting, from the client to the network entity, a request for a manifest file comprising an inquiry for the at least two media segments, receiving, at the client, both the newly created manifest file and the combined media segment; and transiting, at the client, from the first radio channel state into the second radio channel state after the reception step. As described above, usage of the manifest file provides the network entity with a simple and powerful tool for embodying and facilitating the present invention; that is, the client having requested the manifest file does not get an ordinary manifest file, but one having indication the combined media segments in the sense of the present invention. In this way, the client is re-configured to implement the combined media segments without any hardware or software re-equipment of the client becoming necessary.

In the second aspect, the transiting step may be performed substantially immediately after the reception step. As mentioned above, the timeout prior to state transition ($1^{st}$ time period) may be chosen to 2, 10 or 12 seconds; however, if it is there is a degree of certainty that no unexpected request from the client is received (this is, for example, ascertained by the equivalent $2^{nd}$ time period), the $1^{st}$ time period $t_1$ can be shortened to become almost 0, thus entering the power-saving state faster and saving more energy.

Further, the transmitting step of the network entity may further comprise providing, at the network entity, the combined media segment, and transmitting, from the network entity to the client, the combined media segment responsive to the inquiry. Still further, the waiting step of the network entity may be ended by a subsequent inquiry for at least two further media segments. This behaviour ascertains that the network entity does not have to perform an "active" transmission step, but that it is the client that "pulls" the content—that is, media data in the form of (combined) media segments—at its discretion.

Moreover, all steps involved in the first and second aspects between the first combining step and the last waiting step of the network entity may be repeated periodically. This enables to multiply the gain achieved by entering the power-saving mode in one cycle. This can be seen, for example, in FIG. 4B, upper portion: in the first cycle, URA-PCH is attained for app. 5 seconds, whereas the second and subsequent cycle has app. 53 seconds in the URA-PCH state. FIG. 4B, lower portion (having a higher quality of the media data compared to the upper portion) still exhibits enough time in the power saving mode: URA-PCH is attained for 0 seconds ($1^{st}$ cycle; here, the above-described Fast Dormancy would help), app. 43 seconds ($2^{nd}$ cycle), 0 seconds ($3^{rd}$ cycle), app. 23 seconds ($4^{th}$ cycle), app. 35 seconds ($5^{th}$ cycle) and app. 43 seconds ($6^{th}$ and subsequent cycles).

In a second aspect, a computer program product is provided, the computer program product comprising program code portions for performing any of the method aspects disclosed herein when the computer program product is executed on one or more computing devices (e.g., on the terminal device presented herein). The computer program product may be stored on a computer readable recording medium.

In a third aspect, a network entity for managing streaming media traffic is provided, the network entity being capable of assuming at least a first radio channel state and a second radio channel state, a transition from the first radio channel state to the second radio channel state requiring a first predetermined time period $t_1$. The network entity comprises a component adapted to combine, at the network entity, at least two media segments such that a resulting combined media segment comprises media data equivalent to a second predetermined time period $t_2$, the second time period being greater than the first time period; a component adapted to transmit, from the network entity, the combined media segment in the first radio channel state during a third time period $t_3$; a component adapted to initiate transition, at the network entity, from the first to the second radio channel state; and a component adapted to wait, at the network entity after the initiating step, at least for a time period $t=t_2-t_3-t_1$, wherein the second time period is greater than the sum of the first and third time periods.

In a fourth aspect, a system for managing streaming media traffic between the above-described network entity and a client is provided. In that case, the client may comprise a component adapted to transmit, from the client to the network entity, a request for a manifest file comprising an inquiry for the at least two media segments; a component adapted to receive, at the client, both the newly created manifest file and the combined media segment; and a component adapted to transit, at the client, from the first radio channel state into the second radio channel state after the reception step.

It is to be noted that the terminal device (and the system) may implement any of the technical details set forth for the method aspect hereinabove, and thus achieves the same advantages. In other words, the terminal device may comprise further components adapted to perform any of the method steps disclosed herein.

The client may be a mobile or a stationary terminal. As an example, the client may be realized in the form of a mobile (smart-)phone, a notebook computer, a laptop, a subnotebook, a Personal Digital Assistant (PDA), a tablet PC (such as an iPad™), or any hybrids thereof (for example, a Blackberry™ being a hybrid of a smartphone and a PDA), and the like.

BRIEF DESCRIPTION OF THE DRAWINGS

The embodiments of the present invention are described herein below with reference to the accompanying drawings, in which:

FIG. 7 shows a method embodiment for managing streaming media traffic at a network entity.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, while the embodiments will primarily be described in the context of a proxy and an (e)NB; however, this does not rule out the use of less or more devices to implement the present invention.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 5:
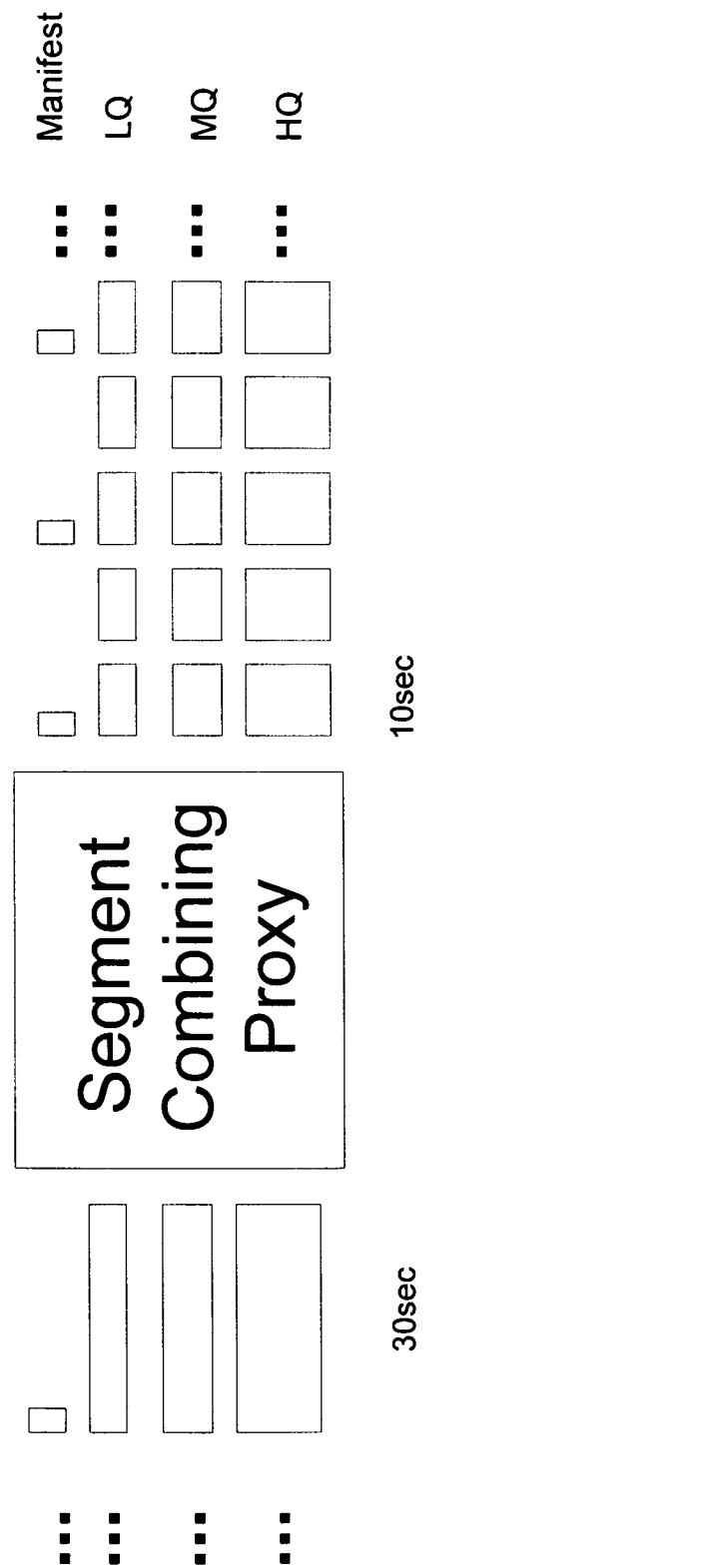
FIG. 5 shows a basic concept of a proxy as an example of a segment combiner according to an embodiment of the present invention.

FIG. 5 shows a basic concept of a proxy as an example of a segment combiner according to an embodiment of the present invention.

That is, the basic concept of the present invention may be summarized in introducing a "Segment Combiner Proxy" into the media path. The function can be realized as a transparent function or as add-on to an HTTP Caching Server. The proxy basically combines several incoming media segments into larger media segments and re-writes the manifest file accordingly.

As shown in FIG. 5, the content of an HTTP Live Streaming HLS may be created with e.g. 10 sec duration per media segment. The .m3u8 playlist (as a non-limiting example of the manifest file) may indicate that the target duration of each media segment is 10 sec. This instructs the receiver (hence, the client not shown in FIG. 5) to fetch a new media segment every 10 sec.

However, the segment combiner (for example, the segment combining proxy) combines multiple media segments (see right-hand part of FIG. 5) into one. Since a new (larger) segment is created (see left-hand part of FIG. 5), the new segment is identified by a new identifier such as a URL, which is announced using e.g. the .m3u8 playlist to the client (or the clients if more than one client is present). The .m3u8 file is re-written and describes the new target durations and the new identifiers (e.g. URLs). For example, some existing URLs of the conventional manifest file can be re-used as well.

The above-described procedure can be applied for any media representation. When the segments are not time aligned, then the Segment Combiner Function combines a different number of incoming media segments into a single outgoing segment, so that each outgoing media segment contains e.g. more than e.g. 80 sec of media data.

As a non-limiting example only, the segment combiner may execute the following steps, wherein the segment combiner function may be collocated e.g. with an HTTP proxy cache:

The combiner receives the request for a manifest file for an adaptive HTTP Streaming from a client. The HTTP proxy may handle all manifest file types (such as .html, .jpg, .m3u8) in the same way.

The segment combiner requests the needed segments as described in the manifest file and requested by the client. The HTTP proxy may parse the manifest file to look for other URLs.

The segment combiner processes the manifest:
   The segment combiner creates a new manifest file and serves the newly created manifest to the client. All succeeding users requesting the same manifest may also be served with the newly created manifest.
   The segment combiner creates new media segments by combining one or more segments. The size of as media segment is much larger than an Internet Protocol (IP) packet size. Thus, a sequence of IP Packets created for each media segment. Each new media segment may be identified by a new URL.
   The segment combiner creates a new manifest file with the new Media Segment URLs. The segment combiner may use the new media segment length.

The segment combiner serves the new manifest with the new media segment URIs to the client. Consequently, the client requests only new (larger) media segments.

Further, it is to be noted that some environments apply an MPEG2 Transport Stream (TS): only HTTP is supported by a native media player. In that case, the present invention can also be realized in a "non-transparent" HTTP Proxy Server, i.e. a server which terminates HTTP Secure (HTTPS). That is, HTTPS is a transport security scheme. Advantageously, the segment combiner function, when implemented in a "non-transparent" HTTP Proxy Server, does not need to differentiate between HTTP or HTTPS.

Figure 1:
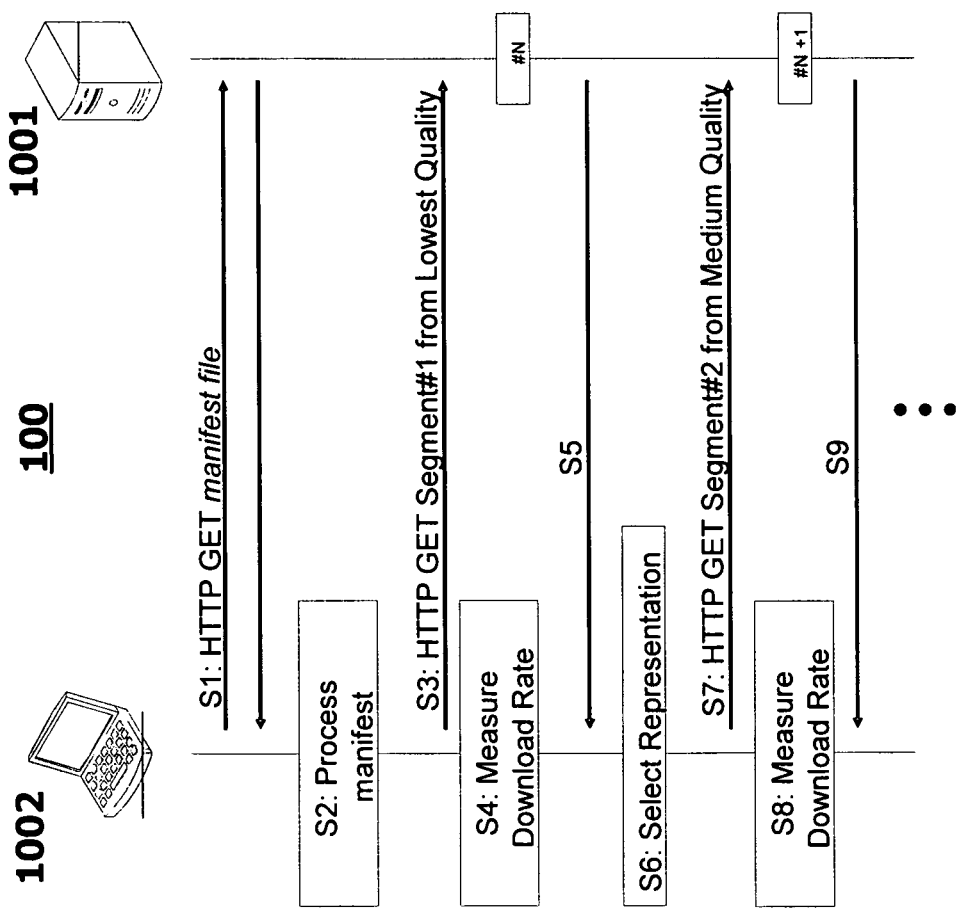
FIG. 1 shows the principle of adaptive HTTP streaming, more particular, the reception of media segments.
Figure 2:
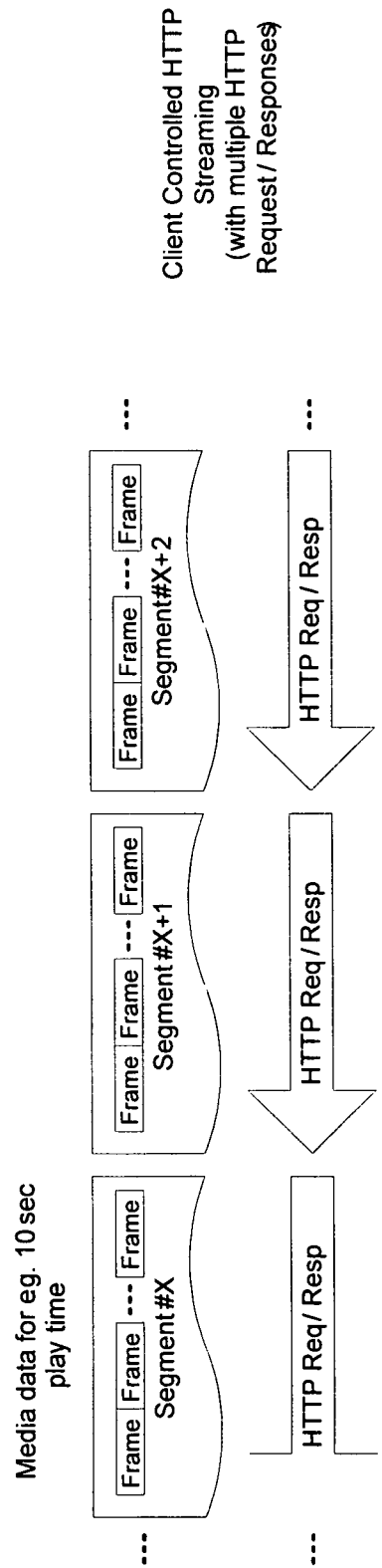
FIG. 2 shows the example of an adaptive HTTP stream.
Figure 3:
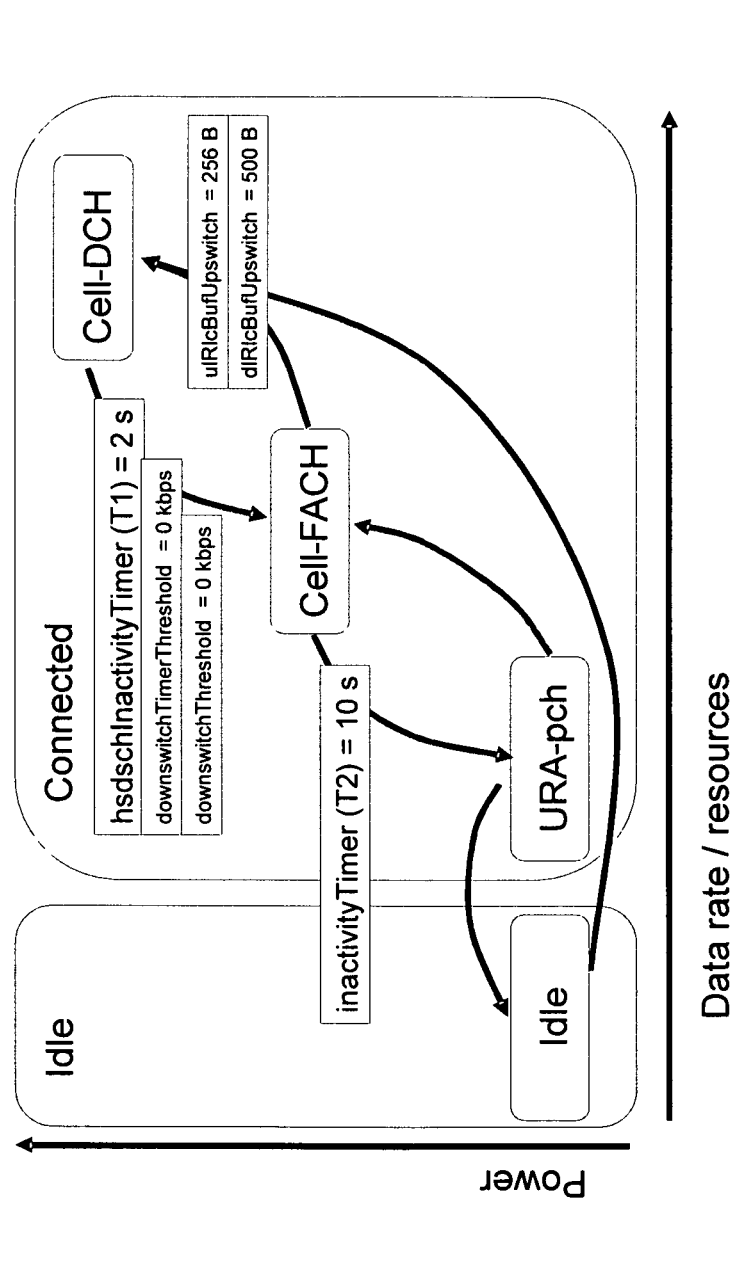
FIG. 3 shows a diagram of data rate plotted against power consumption of different radio channel.
Figure 4:
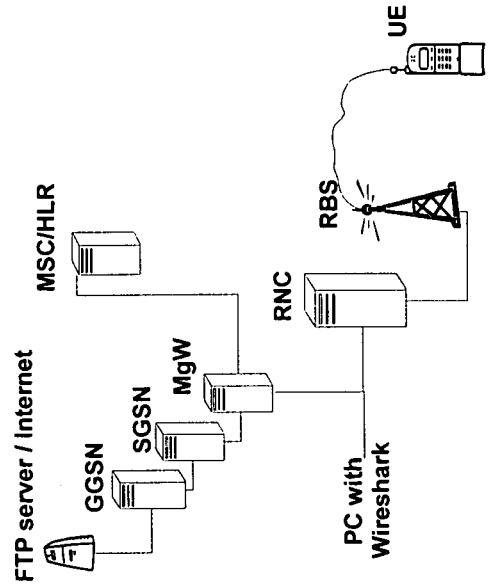
FIG. 4 shows the above-described test set-up.
Figure 4A:
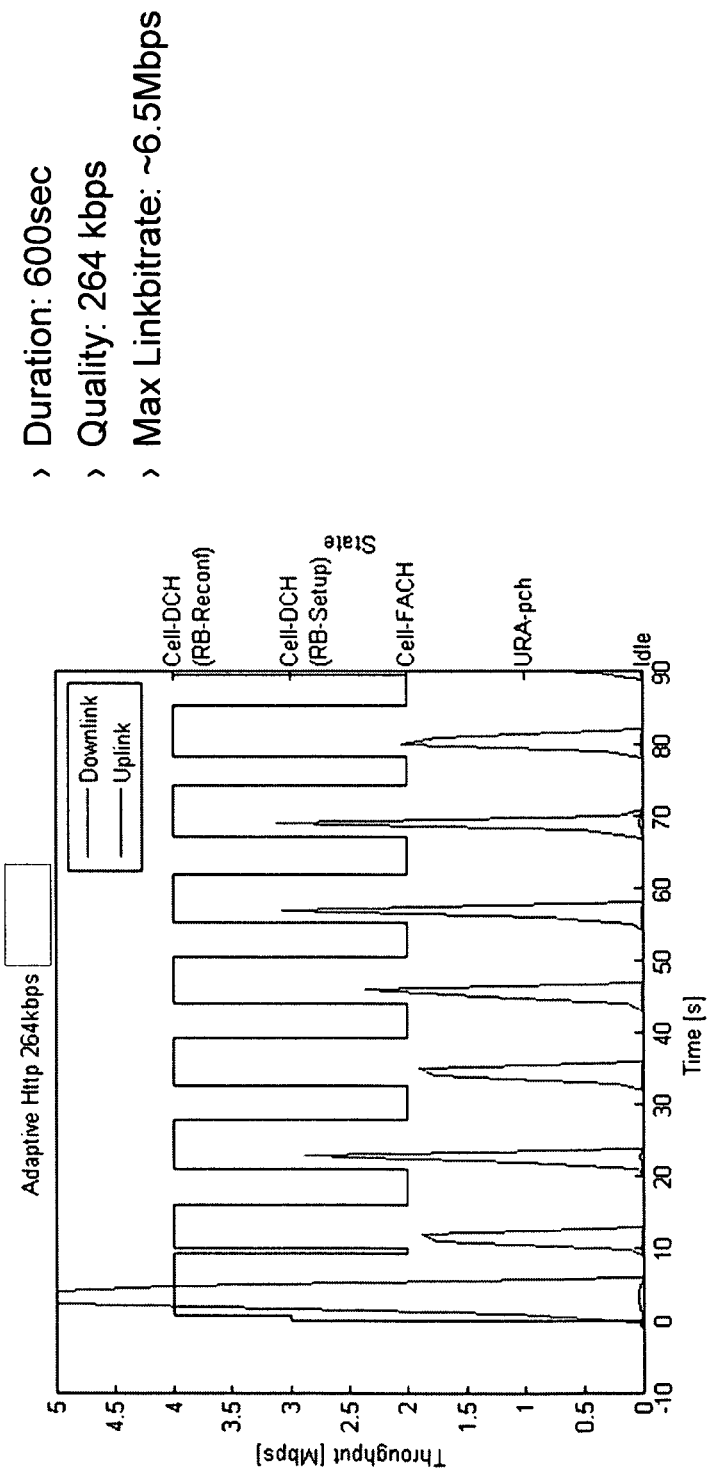
FIG. 4A shows the test result obtained by the set-up depicted in FIG. 4, using a 264 kbps media stream with a media segment size of 10 sec.
Figure 4B:
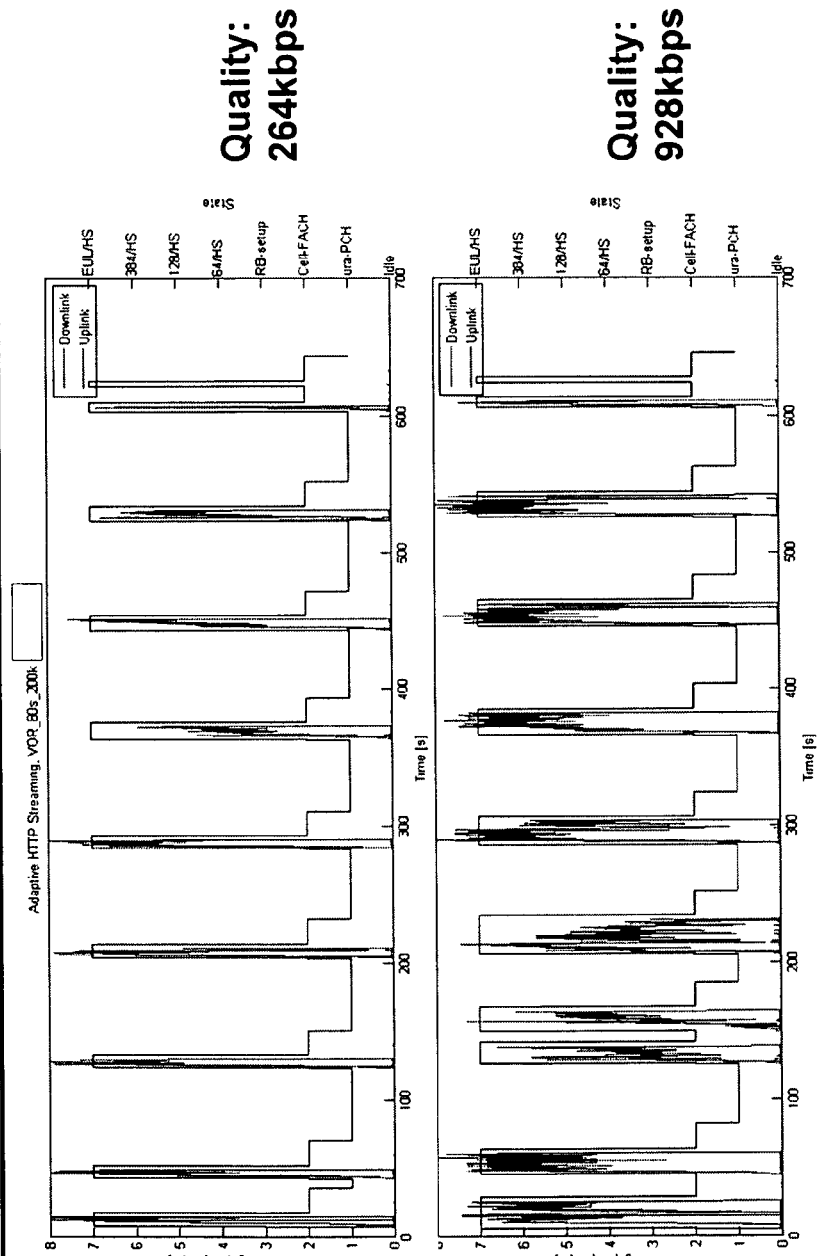
FIG. 4B shows two example graphs of media streams with an equivalent media segment size of 80 seconds of media data.
Figure 6A:
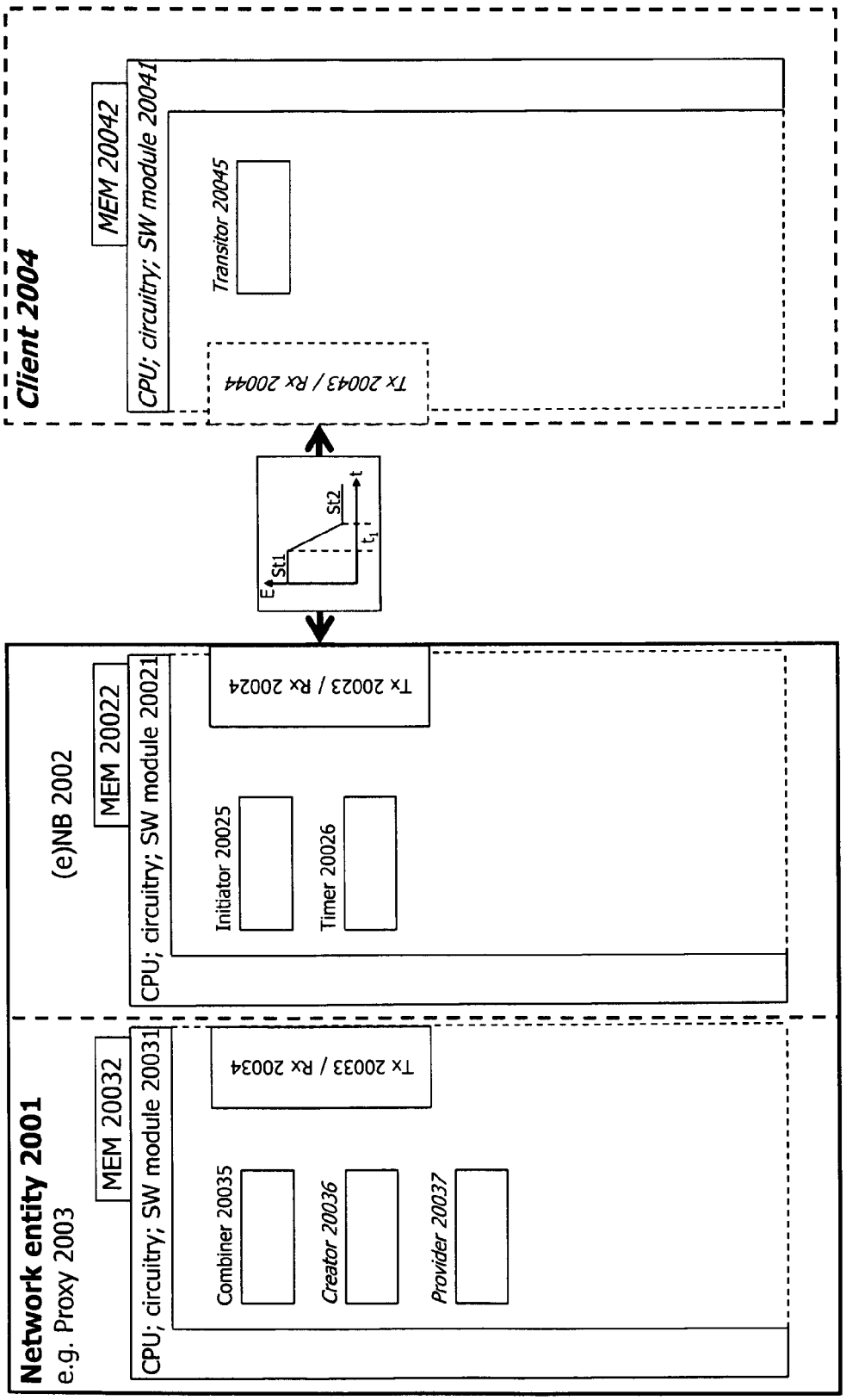
FIG. 6A shows the components comprised in an embodiment of a network entity (and optionally, a client)
Figure 6B:
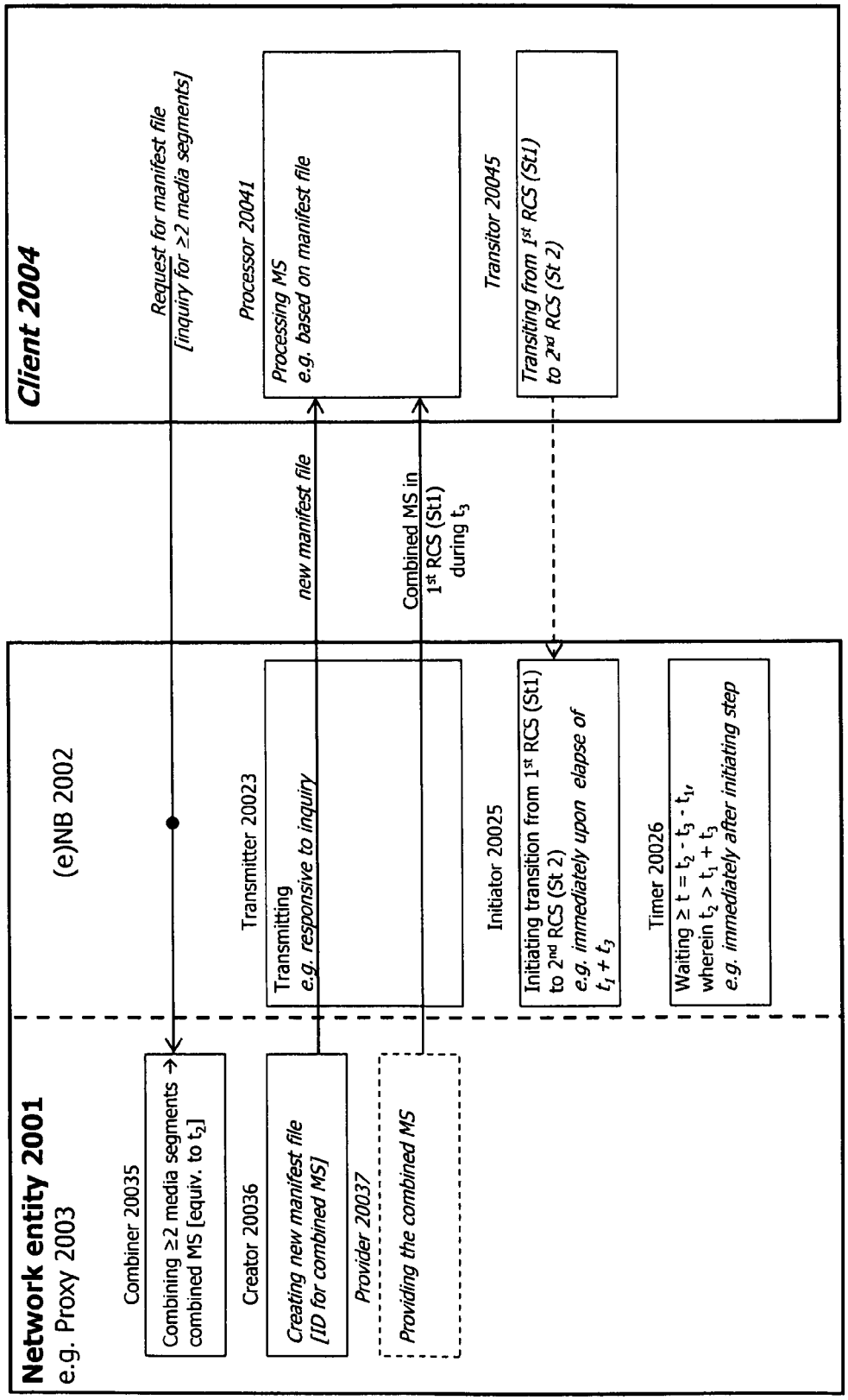
FIG. 6B shows the interaction between the components of the mobile terminal of FIG. 6A.

FIGS. 6A and 6B show an embodiment of a network entity 2001 (as an example, a combination of an (e) nodeB 2002 and a proxy server 2003) for managing streaming media traffic at a network entity. FIG. 6A illustrates the components comprised in the network entity 2001 (and optionally, a client 2004), and FIG. 1B shows the interaction between the components of the network entity 2001 (and client 2004).

As shown in FIG. 6A, the network entity 2001 comprises the (e) nodeB 2002 and the Proxy server 2003. Both the (e) nodeB 2002 and the Proxy server 2003 comprise an own core functionality (e.g. a central processing unit (CPU), a dedicated circuitry or a software module) 20022 or 20032, a memory (and/or database) 20022 or 20032, a transmitter 20023 or 20033 and a receiver 20024 or 20034. In turn the (e) nodeB 2002 comprises an initiator 20025 and a timer 20026; the Proxy Server 2003 comprises a combiner 20035, a creator 20036 and a provider 20037. Further, the optional client 2004 comprises a core functionality 20041, a memory (or database) 20042, a transmitter 20043, a receiver 20044 and a transistor 20045.

As indicated by the dashed extensions of the functional blocks of the CPUs 200x1 (wherein x=2, 3 and 4), the initiator 20025, the timer 20026 (of the (e) nodeB 2002), the combiner 20035, the creator 20036, the provider 20037 (of the Proxy Server 2003) and the transistor 20045 (of the client 2004), as well as the memory 200x2, the transmitter 200x3 and the receiver 200x4 may at least partially be functionalities running on the CPUs 200x1, or may alternatively be separate functional entities or means controlled by the CPU 200x1 and supplying the same with information.

The CPUs 200x1 may be configured, for example by software residing in the memories 200x2, to process various data inputs and to control the functions of the memory 200x2, the transmitter 200x3 and the receiver 200x4 (as well as the initiator 20025, the timer 20026 (of the (e) nodeB 2002), the combiner 20035, the creator 20036, the provider 20037 (of the Proxy Server 2003) and the transistor 20045 (of the client 2004)). The memory 200x2 may serve for storing code means for carrying out the methods according to the aspects disclosed herein, when run on the CPU 200x1.

It is to be noted that the transmitter 200x3 and the receiver 200x4 may alternatively be provided as an integral transceiver, as is shown in FIG. 6A. It is further to be noted that the transmitters/receivers may be implemented as physical transmitters/receivers for transceiving via an air interface (e.g., between the network entity 2001 and the client 2004), as routing entities/interfaces between network elements (e.g., for transmitting/receiving data packets between (e)NB 2002 and Proxy Server 2003 when disposed as separate network functionalities), as functionalities for writing/reading information into/from a given memory area (e.g. between (e)NB 2002 and Proxy Server 2003 when disposed as an integral network entity 2001) or as any suitable combination of the above. At least one of the above-described the initiator 20025, the timer 20026 (of the (e) nodeB 2002), the combiner 20035, the creator 20036, the provider 20037 (of the Proxy Server 2003) and the transistor 20045 (of the client 2004), as well as the network entity 2001, or the respective functionalities carried out, may also be implemented as a chipset, module or subassembly.

FIG. 7 illustrates an embodiment of a method for managing streaming media traffic at the network entity 2001 in a (cellular) communication network 200. As shown in the box between the boxes 2001 and 2004, the network 200 may at least assume a first state St1 and a second state St2, wherein the first state St1 may consume more energy than the second state St2, and wherein a transition from the first to the second state takes time period $t_1$.

In the signalling diagram of FIG. 7, signalling between elements is indicated in the horizontal direction, while time aspects between signalling are reflected in the vertical arrangement of the signalling sequence as well as in the sequence numbers. It is to be noted that the time aspects indicated in FIG. 7 do not necessarily restrict any one of the method steps shown to the step sequence outlined in FIG. 7. This applies in particular to method steps that are functionally disjunctive with each other; for example, it is not required that the combined media segment and the optional new manifest file are transmitted in the same step; it is also immaterial which of the combined media segment and the manifest file is transmitted first.

Referring still to the signalling diagram of FIG. 7 (to be read along with the network entity 2001 shown in FIGS. 6A and 6B), in an optional step S1-1, the transmitter 20043 of the client 2004 may transmit, from the client to the network entity, a request for a manifest file comprising an inquiry for the at least two media segments. In an optional step S2-1, the receiver 20024 of the (e)NB 2002 may receive the request for the manifest file comprising the inquiry for the at least two media segments.

Then, in step S2-2, the combiner 20035 of the Proxy Server 2003 combines the at least two media segments such that a resulting combined media segment comprises media data equivalent to a second predetermined time period $t_2$, the second time period being greater than the first time period $t_1$ (required for transition from St1 to St2).

Optionally, in step S2-3, the creator 20036 of the Proxy Server 2003 may create a new manifest file (such as of a .m3u8 playlist, a .ismc file or a .MPD file) comprising an identifier for the combined media segment. The created new manifest file may further comprise an indicator (such as a URL) for indicating the first predetermined time period.

In this respect, as a non-limiting implementation example, HLS uses the .m3u8 playlist format for the manifest file and MPEG2-TS for the media segments. In case of HLS, several incoming media segments can be combined into one larger one without any extra consideration. The combined media segment is again a valid media segment. The new .m3u8 playlist is created with input from the old .m3u8 segment. The old playlist contains the segment duration of each media segment (e.g. an individual integer per URL). It also contains the average (target) duration of each media segment. The segment combiner 20035 sums up the segment duration of the contributing input segments into the according output segment.

As another non-limiting example, the modification of an ISM may be effected such that each media segment contains one (or more) MP4 File fragments, which are completely self-contained. All pointers of all moof-tables point into the mdat section of the input media segment. Thus, the output media segment can be created by combining a number of input media segments. The manifest file of IMS is an ISMC file, which is in turn a special form of an XML file (see example below). The URLs are described through an URL template. The media duration of each media segment is described as a table inside the ISMC (e.g. <c n="4" d="12000000"/> is a table entry for index n=4, wherein duration of that media segment is described as d="12000000"). The segment combiner 20035 writes a new ISMC file considering the possibly new URL template of the combined segments. Duration of the new media segment is calculated by summing up the durations of the contributing media segments.

An example of the IMSC file may have the following layout, wherein the last 9 lines may constitute the above-described table for describing the media segment duration:

```
<?xml version="1.0" encoding="utf-8"?>
<!--Created with mod_smooth_streaming(version=1.0.2)-->
<SmoothStreamingMedia MajorVersion="1" MinorVersion="0"
Duration="12115600000">
<StreamIndex Type="video" Subtype="H264" Chunks="1032"
Url="QualityLevels({bitrate})/Fragments(video={start time})">
<QualityLevel Bitrate="398000" FourCC="H264" Width="640"
Height="480"
CodecPrivateData="000000016742C01EB9101407B6022000000
3002000000651E2C5D40000000168CE3C80" />
<QualityLevel Bitrate="896000" FourCC="H264" Width="640"
Height="480"
CodecPrivateData="000000016742C01EB9101407B6022000000
3002000000651E2C5D40000000168CE3C80" />
<QualityLevel Bitrate="1393000" FourCC="H264" Width="640"
Height="480"
CodecPrivateData="000000016742C01EB9101407B6022000000
3002000000651E2C5D40000000168CE3C80" />
<QualityLevel Bitrate="1781000" FourCC="H264" Width="640"
Height="480"
CodecPrivateData="000000016742C01EB9101407B6022000000
3002000000651E2C5D40000000168CE3C80" />
<c n="0" d="12000000" />
<c n="1" d="12000000" />
<c n="2" d="12000000" />
<c n="3" d="12000000" />
<c n="4" d="12000000" />
<c n="5" d="12000000" />
<c n="6" d="12000000" />
<c n="7" d="12000000" />
<c n="8" d="12000000" />
```

As a third non-limiting example, the combining of segments in the case of MPEG DASH may involve the media segments containing a 'sidx' box. The 'sidx' box allows for simpler navigation through the playback within a media segment. In case of a segment combiner 20035 being applied, the 'sidx' box would be re-written accordingly.

Resuming the signal flow of FIG. 7 (in conjunction with FIGS. 6A and 6B), in step S2-4, the transmitter 20023 of the (e)NB 2002 transmits, from the network entity, the combined media segment in the first radio channel state during a third time period $t_3$ (which is minimally required for combined media segment transmission). Optionally, the transmitter 20023 of the (e)NB 2002 may be operably connected to a provider 20037 of the Proxy server 2003 that provides, at the network entity, the combined media segment; further, the transmitter 20023 of the (e)NB 2002 may transmit, from the network entity to the client, the combined media segment responsive to the inquiry. Accordingly, in an optional step S1-2, the receiver 20044 of the client 2004 may receive, at the client, both the newly created manifest file and the combined media segment. Further, in an optional step S1-3, the transistor 20045 of the client 2004 may cause the client to transit from the first radio channel state St1 into the second radio channel state St2 after the reception step S1-2. In the latter case, the transistor 20045 of the client 2004 may cause the client to transit from St1 to St2 substantially immediately after the reception step. The transiting step performed by the client 2004 may influence or trigger the subsequent initiating step S2-5 of the (e)NB 2002.

Then, in step S2-5, the initiator 20025 of the (e)NB 2002 initiates transition, at the network entity, from the first to the second radio channel state.

Afterwards, in step S2-6, the timer 20026 of the (e)NB 2002 causes the network entity 2001 to wait, after the initiating step, for at least for a time period $t=t_2-t_3-t_1$, wherein the second time period is greater than the sum of the first and third time periods. Optionally, the timer 20026 of the (e)NB 2002 may be ended or interrupted by a subsequent inquiry for at least two further media segments. In an option for accelerating state transition, the initiator 20025 may operate immediately upon elapse of a sum of the first and third time periods, and the timer 20026 may be started immediately after the initiating step.

As mentioned above, the combiner 20035 may combine at least two media segments having a data amount less than transmittable during the second time period $t_2$ in the first radio channel state St1. This enables state transition from St1 into St2 for saving power.

The network states St1 and St 2, and the related transition time period $t_1$, may assume one of the following examples:
  The first radio channel state St1 may be a Cell-DCH state, and the second radio channel state St2 may be a Cell-FACH state. In this case, the time period $t_1$ may become 2 seconds.
  The first radio channel state St1 may be the Cell-FACH state, and the second radio channel state St2 is the URA-PCH state. In this case, the time period $t_1$ may become 10 seconds.
  The first radio channel state St1 may be the Cell-DCH state, and the second radio channel state St2 may be the URA-PCH state. In this case, the time period $t_1$ may become 12 seconds.

However, the above examples are not to be construed as limiting. As described hereinabove, any suitable transition time $t_1$ may be chosen for leveraging between too slow transition and too quick transition; further, "state transition" may include direct transition from one state to another, but as well indirect transition by passing one or more intermediate states.

Concerning the equivalent time period $t_2$, as mentioned above, that time period $t_2$ may range between 40 seconds to 80 seconds or more, or 60 seconds to 80 seconds or more. However, this is not to be construed as limiting to the above ranges: $t_2$ may assume the individual values of 30 seconds, 40 seconds, 60 seconds or 80 seconds; still further, as long as equivalent time period $t_2$ is greater than [$t_1$ (state transition)+ $t_3$ (actual transmission time)], the present invention is achieved. Moreover, $t_2$ may be an integer multiple of the (non-combined) media segment duration (e.g. $t_2$=30, 40, 60 or 80 seconds if the segment duration is e.g. 10 seconds), but this is not a prerequisite; even if the media segment duration (e.g. 10 seconds) is relatively prime to time period $t_2$, the present invention can still be applied.

As mentioned above, the network entity 2001 may comprise a transparent function or an add-on to a Hypertext Transfer Protocol, HTTP, server. Alternatively, as described hereinabove in conjunction with FIGS. 6A, 6B and 7, the network entity 2001 may comprise the Proxy Server 2003 or a nodeB/ evolved nodeB 2002 without limitation.

Finally, all steps described above may be repeated periodically for multiplying the power saving (and system resource saving) achieved by the present invention.

As has become apparent from the embodiments described hereinabove, the technique presented herein brings about one or more of the following advantages. Any OTT adaptive HTTP streaming session can be optimized to reduce the battery drain of mobiles. Also the consumed system resources are saved.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for managing streaming media traffic at a network entity, the network entity being capable of assuming at least a first radio channel state and a second radio channel state, a transition from the first radio channel state to the second radio channel state requiring a first predetermined time period $t_1$, wherein the method is performed in the network entity and comprises the steps of:
   combining, at the network entity, at least two media segments such that a resulting combined media segment comprises media data equivalent to a second predetermined time period $t_2$, the second time period being greater than the first time period;
   transmitting, from the network entity, the combined media segment in the first radio channel state during a third time period $t_3$;
   initiating transition, at the network entity, from the first to the second radio channel state; and
   waiting, at the network entity after the initiating step, at least for a time period $t=t_2-t_3-t_1$, wherein the second time period is greater than the sum of the first and third time periods.

2. The method of claim 1, wherein, in the combining step, the at least two media segments have a data amount less than transmittable during the second time period in the first radio channel state.

3. The method of claim 1, wherein,
   the initiating step is performed immediately upon elapse of a sum of the first and third time periods, and
   the waiting step is performed immediately after the initiating step.

4. The method of claim 1, further comprising, prior to the combining step:
   receiving a request for a manifest file comprising an inquiry for the at least two media segments.

5. The method of claim 4, further comprising:
   creating a new manifest file comprising an identifier for the combined media segment.

6. The method of claim 5, wherein the created new manifest file further comprises an indicator for indicating the first predetermined time period.

7. The method of claim 5, wherein the identifier is a uniform resource locator, URL.

8. The method of claim 4, wherein the manifest file is one of a .m3u8 playlist, a .ismc file and a .MPD file.

9. The method of claim 1, wherein:
   the first radio channel state is a Cell Dedicated Channel, Cell-DCH, state, and
   the second radio channel state is a Cell Forward Access Channel, Cell-FACH, state.

10. The method of claim 9, wherein the first time period is 2 seconds.

11. The method of claim 1, wherein:
   the first radio channel state is a Cell Forward Access Channel, Cell-FACH, state, and
   the second radio channel state is a UTRAN Registration Area Paging Channel, URA-PCH, state, wherein UTRAN means UMTS Terrestrial Radio Access Network, and UMTS means Universal Mobile Telecommunications System.

12. The method of claim 11, wherein the first time period is 10 seconds.

13. The method of claim 1, wherein:
   the first radio channel state is a Cell Dedicated Channel, Cell-DCH, state, and
   the second radio channel state is a UTRAN Registration Area Paging Channel, URA-PCH, state, wherein UTRAN refers to a UMTS Terrestrial Radio Access Network, and UMTS refers to a Universal Mobile Telecommunications System.

14. The method of claim 13, wherein the first time period is 12 seconds.

15. The method of claim 1, wherein the second time period is between 40 seconds to 80 seconds.

16. The method of claim 1, wherein the second time period is between 60 seconds to 80 seconds.

17. The method of claim 1, wherein the network entity comprises one of a transparent function and an add-on to a Hypertext Transfer Protocol, HTTP, server.

18. The method of claim 1, wherein the network entity comprises a proxy server and one of a nodeB and an evolved nodeB.

19. The method of claim 18, wherein:
   the combining step is performed by the proxy server, and
   the transmitting, initiating and waiting steps are performed by the one of the node B and evolved nodeB.

20. The method of claim 1, wherein all steps between the first combining step and the last waiting step of the network entity are repeated periodically.

21. The method of claim 1, wherein the second time period is 80 seconds or more.

22. The method of claim 1, wherein the second time period is 80 seconds or more.

23. A computer program product comprising program code portions stored on a non-transitory computer readable recording medium for performing the method of claim 1, when the computer program product is executed on one or more computing devices.

24. A method for managing streaming media traffic between a network entity and a client, the network entity being capable of assuming at least a first radio channel state and a second radio channel state, a transition from the first radio channel state to the second radio channel state requiring a first predetermined time period $t_1$, wherein the method performed in the network entity comprises:
   combining, at the network entity, at least two media segments such that a resulting combined media segment comprises media data equivalent to a second predetermined time period $t_2$, the second time period being greater than the first time period;
   transmitting, from the network entity, the combined media segment in the first radio channel state during a third time period $t_3$;
   initiating transition, at the network entity, from the first to the second radio channel state; and
   waiting, at the network entity after the initiating step, at least for a time period $t=t_2-t_3-t_1$, wherein the second time period is greater than the sum of the first and third time periods,
   and wherein the method performed in the client comprises:
   transmitting, from the client to the network entity, a request for a manifest file comprising an inquiry for the at least two media segments;
   receiving, at the client, both the newly created manifest file and the combined media segment; and transitioning, at the client, from the first radio channel state into the second radio channel state after the reception step.

25. The method of claim 24, wherein the transitioning step is performed substantially immediately after the reception step.

26. The method of claim 24, wherein the transmitting step of the network entity further comprises:
providing, at the network entity, the combined media segment, and
transmitting, from the network entity to the client, the combined media segment responsive to the inquiry.

27. The method of claim 24, wherein the waiting step of the network entity is ended by a subsequent inquiry for at least two further media segments.

28. A device for managing streaming media traffic, the device being capable of assuming at least a first radio channel state and a second radio channel state, a transition from the first radio channel state to the second radio channel state requiring a first predetermined time period $t_1$, wherein the device comprises a processor and a memory, said memory comprising program code portions which, when executed by said processor, cause the device to:
combine at least two media segments such that a resulting combined media segment comprises media data equivalent to a second predetermined time period $t_2$, the second time period being greater than the first time period;
transmit the combined media segment in the first radio channel state during a third time period $t_3$;
initiate transition from the first to the second radio channel state; and
after the initiating step, at least for a time period $t=t_2-t_3-t_1$, wherein the second time period is greater than the sum of the first and third time periods.

29. The device of claim 28, wherein the memory further comprises program code portions which, when executed by said processor, cause the device to:
receive, prior to the combining, a request for a manifest file comprising an inquiry for the at least two media segments.

30. The device of claim 29, wherein the memory further comprises program code portions which, when executed by said processor, cause the device to:
create a new manifest file comprising an identifier for the combined media segment.

31. The device of claim 28, further comprising one of a transparent function and an add-on to a Hypertext Transfer Protocol, HTTP, server.

32. The device of claim 28, further comprising a proxy server and one of a nodeB and an evolved nodeB.

33. A system for managing streaming media traffic between a network entity capable of assuming at least a first radio channel state and a second radio channel state, a transition from the first radio channel state to the second radio channel state requiring a first predetermined time period $t_1$, and a client, wherein the network entity comprises a processor and a memory, said memory comprising program code portions which, when executed by said processor, cause the network entity to:
combine at least two media segments such that a resulting combined media segment comprises media data equivalent to a second predetermined time period $t_2$, the second time period being greater than the first time period;
transmit the combined media segment in the first radio channel state during a third time period $t_3$;
initiate transition from the first to the second radio channel state; and
wait after the initiating step, at least for a time period $t=t_2-t_3-t_1$, wherein the second time period is greater than the sum of the first and third time periods; and
wherein the client comprises a processor and a memory, said memory comprising program code portions which, when executed by said processor, cause the client to:
transmit to the network entity, a request for a manifest file comprising an inquiry for the at least two media segments;
receive both the newly created manifest file and the combined media segment; and
transit from the first radio channel state into the second radio channel state after the reception step.

34. The system of claim 33, wherein the memory further comprises program code portions which, when executed by said processor, cause the network entity to:
provide the combined media segment, and
transmit to the client, the combined media segment responsive to the inquiry.

* * * * *